(12) United States Patent
Rowney

(10) Patent No.: US 8,661,498 B2
(45) Date of Patent: Feb. 25, 2014

(54) SECURE AND SCALABLE DETECTION OF PRESELECTED DATA EMBEDDED IN ELECTRONICALLY TRANSMITTED MESSAGES

(75) Inventor: Kevin T. Rowney, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 2178 days.

(21) Appl. No.: 10/247,002

(22) Filed: Sep. 18, 2002

(65) Prior Publication Data

US 2010/0332481 A1  Dec. 30, 2010

(51) Int. Cl.
*H04L 29/06* (2006.01)

(52) U.S. Cl.
USPC .......... 726/1; 726/14; 726/26; 713/154; 707/999.102

(58) Field of Classification Search
None
See application file for complete search history.

(56) References Cited

U.S. PATENT DOCUMENTS

| | | | |
|---|---|---|---|
| 4,858,152 A | | 8/1989 | Estes |
| 5,212,821 A | | 5/1993 | Gorin et al. |
| 5,379,391 A | * | 1/1995 | Belsan et al. ............... 711/114 |
| 5,384,892 A | | 1/1995 | Strong |
| 5,739,391 A | * | 4/1998 | Ruppel et al. ............... 562/532 |
| 5,832,212 A | | 11/1998 | Cragun et al. |
| 5,883,588 A | * | 3/1999 | Okamura ......................... 341/5 |
| 5,892,905 A | | 4/1999 | Brandt et al. |
| 5,958,015 A | | 9/1999 | Dascalu |
| 5,960,080 A | | 9/1999 | Fahlman et al. |
| 5,996,011 A | | 11/1999 | Humes |
| 6,047,283 A | * | 4/2000 | Braun ..................... 707/999.003 |
| 6,055,538 A | | 4/2000 | Kessenich et al. |
| 6,065,056 A | | 5/2000 | Bradshaw et al. |
| 6,073,142 A | * | 6/2000 | Geiger et al. ................. 715/205 |
| 6,233,618 B1 | | 5/2001 | Shannon |
| 6,314,190 B1 | | 11/2001 | Zimmermann |
| 6,321,224 B1 | | 11/2001 | Beall et al. |
| 6,347,087 B1 | * | 2/2002 | Ganesh et al. ............... 370/392 |
| 6,347,374 B1 | | 2/2002 | Drake et al. |
| 6,347,376 B1 | * | 2/2002 | Attwood et al. .................. 726/1 |

(Continued)

FOREIGN PATENT DOCUMENTS

| | | |
|---|---|---|
| CA | 2 499 508 | 4/2004 |
| CA | 2 597 083 | 8/2006 |

(Continued)

OTHER PUBLICATIONS

Lupu, Emil; Sloman, Morris. A Policy Based Role Object Model. EDOC '97 Proceedings. Pub. Date: 1997. Relevant pp. 36-47. Found on the World Wide Web at: ((row or column or tabular) and (search$ or investigat$) and (polic$ or guideline or rule or parameter) and network and ((viola$ or infring$ or breach$4 or disobey$4 or abus$3 or break$3 or.*

(Continued)

*Primary Examiner* — Nathan Flynn
*Assistant Examiner* — Jeremiah Avery
(74) *Attorney, Agent, or Firm* — Lowenstein Sandler LLP

(57) ABSTRACT

A method and apparatus for detecting preselected data embedded in electronically transmitted messages is described. In one embodiment, the method comprises monitoring messages electronically transmitted over a network for embedded preselected data and performing content searches on the messages to detect the presence of the embedded preselected data using an abstract data structure derived from the preselected data.

39 Claims, 6 Drawing Sheets

(56) References Cited

U.S. PATENT DOCUMENTS

| | | | |
|---|---|---|---|
| 6,360,215 B1 | 3/2002 | Judd et al. | |
| 6,374,241 B1* | 4/2002 | Lamburt et al. | 707/999.006 |
| 6,396,513 B1* | 5/2002 | Helfman et al. | 715/752 |
| 6,442,686 B1 | 8/2002 | McArdle et al. | |
| 6,453,338 B1 | 9/2002 | Shiono | |
| 6,604,141 B1 | 8/2003 | Ventura | |
| 6,618,725 B1 | 9/2003 | Fukuda et al. | |
| 6,636,838 B1 | 10/2003 | Perlman et al. | |
| 6,639,615 B1 | 10/2003 | Majumdar | |
| 6,714,936 B1* | 3/2004 | Nevin, III | 707/999.102 |
| 6,732,087 B1 | 5/2004 | Hughes et al. | |
| 6,754,832 B1* | 6/2004 | Godwin et al. | 726/14 |
| 6,768,986 B2* | 7/2004 | Cras et al. | 707/2 |
| 6,769,032 B1 | 7/2004 | Katiyar et al. | |
| 6,778,979 B2* | 8/2004 | Grefenstette et al. | 707/999.003 |
| 6,779,120 B1 | 8/2004 | Valente et al. | |
| 6,829,635 B1 | 12/2004 | Townsend | |
| 6,871,284 B2 | 3/2005 | Cooper et al. | |
| 6,941,466 B2 | 9/2005 | Mastrianni et al. | |
| 6,965,886 B2 | 11/2005 | Govrin et al. | |
| 6,983,186 B2* | 1/2006 | Navani et al. | 700/95 |
| 7,114,185 B2 | 9/2006 | Moore et al. | |
| 7,130,885 B2 | 10/2006 | Chandra et al. | |
| 7,146,402 B2* | 12/2006 | Kucherawy | 709/206 |
| 7,162,738 B2 | 1/2007 | Dickinson, III et al. | |
| 7,191,252 B2 | 3/2007 | Redlich et al. | |
| 7,222,158 B2 | 5/2007 | Wexelblat | |
| 7,237,008 B1* | 6/2007 | Tarbotton et al. | 709/206 |
| 7,249,175 B1 | 7/2007 | Donaldson | |
| 7,320,004 B1 | 1/2008 | DeLuca et al. | |
| 7,472,114 B1 | 12/2008 | Rowney et al. | |
| 7,516,492 B1 | 4/2009 | Nisbet et al. | |
| 2001/0037324 A1 | 11/2001 | Agrawal et al. | |
| 2002/0010679 A1 | 1/2002 | Felsher | |
| 2002/0073313 A1 | 6/2002 | Brown et al. | |
| 2002/0093676 A1 | 7/2002 | Parry | |
| 2002/0129140 A1 | 9/2002 | Peled et al. | |
| 2002/0138579 A1 | 9/2002 | Goldberg | |
| 2002/0178228 A1 | 11/2002 | Goldberg | |
| 2002/0198766 A1 | 12/2002 | Magrino et al. | |
| 2002/0199095 A1 | 12/2002 | Bandini et al. | |
| 2003/0051026 A1 | 3/2003 | Carter et al. | |
| 2003/0093518 A1 | 5/2003 | Hiraga | |
| 2004/0039991 A1 | 2/2004 | Hopkins et al. | |
| 2004/0225645 A1 | 11/2004 | Rowney et al. | |
| 2005/0027723 A1 | 2/2005 | Jones et al. | |
| 2005/0086252 A1 | 4/2005 | Jones et al. | |
| 2005/0138110 A1 | 6/2005 | Redlich et al. | |
| 2005/0182765 A1 | 8/2005 | Liddy | |
| 2005/0216771 A1 | 9/2005 | Malcom | |
| 2006/0005247 A1 | 1/2006 | Zhang et al. | |
| 2006/0184549 A1 | 8/2006 | Rowney et al. | |
| 2006/0224589 A1 | 10/2006 | Rowney et al. | |
| 2007/0130255 A1 | 6/2007 | Wolovitz et al. | |

FOREIGN PATENT DOCUMENTS

| | | |
|---|---|---|
| JP | 2005-539334 | 12/2005 |
| JP | 2008-537195 | 9/2008 |
| WO | WO2004/027653 | 4/2004 |
| WO | WO2006/088952 | 8/2006 |

OTHER PUBLICATIONS

Oracle8TM Tuning, Release 8.0, Dec. 1997, Oracle®.

Kaufman, et al., "Network Security—Private Communication in a Public World," 1995, Prentice, Hall PTR, p. 80.

Dale, et al., "Programming and Problem Solving with C++," 2002, Jones and Bartlett Publishers, 3rd Edition, pp. 653-662.

Deital, et al, "C++—How to Program," 2001 Prentice Hall, 3rd Edition, pp. 273-279.

Koch, et al., Oracle8—The Complete Reference, 1997, Osborn McGraw-Hill, pp. 9-7 and 51-62.

Alonso, Omar, et al, Oracle Secure Enterprise Search 10g, An Oracle Technical White Paper, Mar. 2006, 21 pages.

Attenex, Attenex Patterns Suite, http://www.attenex.com/products_services/attenex_patterns_suite.aspx, Downloaded Feb. 20, 2008, 2 pages.

Autonomy, Autonomy Group product overview, http://www.autonomy.com/content/products/index.en.html, Downloaded Feb. 20, 2008, 2 pages.

Autonomy, Security, http://www.autonomy.com/content/Technology/Technology_Benefits/security, Feb. 20, 2008, 2 pages.

Autonomy, Technology overview, http://www.autonomy.com/content/Techmology/index.en.html, Downloaded Feb. 20, 2008, 2 pages.

Autonomy, Limitations of Other Approaches, http://www.autonomy.com/content/Technology/Limitations_Other _Approaches, Downloaded Feb. 20, 2008, 2 pages.

Buchta, Stefan, Oracle Secure Enterprise Search Version 10.1.8.2, An Oracle Technical White Paper, Oct. 2007, 30 pages.

Clearwell Systems, The Clearwell E-Discovery Platform®, http://www.clearwellsystems.com/products/e-discovery-platform, Downloaded Feb. 20, 2008 2 pages.

Clearwell Systems, The Clearwell E-Discovery Platform: Analysis, http://www.clearwellsystems.com/products/e-discovery-analysis.php, Downloaded Feb. 20, 2008, 1 page.

Clearwell Systems, The Clearwell E-Discovery Platform: Case Management, http://www.clearwellsystems.com/products/e-discovery-case-management, Downloaded Feb. 20, 2008 2 pages.

Clearwell Systems The Clearwell E-Discovery Platform: Processing, http://www.clearwellsystems.com/products/e-discovery-processing.php, Downloaded Feb. 20, 2008, 2 pages.

Clearwell Systems The Clearwell E-Discovery Platform: Review, http://www.clearwellsystems.com/products/e-discovery-review.php, Downloaded Feb. 20, 2008 2 pages.

Clearwell Systems The Clearwell E-Discovery Platform: Search &Cull-Down, http://www.clearwellsystems.com/products/e-discovery-search-cull.php, Downloaded Feb. 20, 2008 1 page.

Fast, Fast ESP Revitalizing your search experience with intelligent, user-centric search, 2007, Fast Search & Transfer ASA. , 6 pages.

Google, Google Search Appliance, http://www.google.com/enterprise/gsa/, Downloaded, Feb. 20, 2008, 2 pages.

Guidance Software, EnCase® eDiscovery Suite, http://www.guidancesoftware.com/products/ediscovery_index.aspx, Downloaded Feb. 20, 2008, 2 pages.

Krishnaprasad, Muralidhar, et al, Oracle Searching Enterprise Applications (Siebel 7.8 and E-Business Suite 11i) with Oracle Secure Enterprise Search 10.1.8, An Oracle White Paper, Jan. 2007, 25 pages.

Oracle Secure Enterprise Search 10G, Mar. 2006, 8 pages.

PCT Search Report PCT /U506/5317 dated Jul. 24, 2006, 5 pages.

Zantaz, Enterprise Archive Solution (EAS) Product family, Datasheet, 4 pages.

Office Action for U.S. Appl. No. 10/431,145 mailed Oct. 23, 2006.
Office Action for U.S. Appl. No. 10/431,145 mailed Jul. 26, 2007.
Office Action for U.S. Appl. No. 10/431,145 mailed Feb. 25, 2008.
Notice of Allowance for U.S. Appl. No. 10/431,145 mailed Aug. 20, 2008.
Office Action for U.S. Appl. No. 10/607,718 mailed Feb. 10, 2006.
Office Action for U.S. Appl. No. 10/607,718 mailed Jun. 28, 2006.
Office Action for U.S. Appl. No. 10/607,718 mailed Nov. 15, 2006.
Office Action for U.S. Appl. No. 10/607,718 mailed Jul. 10, 2007.
Office Action for U.S. Appl. No. 10/607,718 mailed Jan. 8, 2008.
Office Action for U.S. Appl. No. 10/607,718 mailed Jul. 3. 2008.
Office Action for U.S. Appl. No. 10/833,538 mailed Oct. 31, 2006.
Office Action for U.S. Appl. No. 10/833,538 mailed Jul. 23, 2007.
Office Action for U.S. Appl. No. 10/833,538 mailed Feb. 14, 2008.
Notice of for U.S. Appl. No. 10/833,538 mailed Aug. 6, 2008.
Office Action for U.S. Appl. No. 10/892,982 mailed Jan. 23, 2007.
Office Action for U.S. Appl. No. 10/892,982 mailed Sep. 17, 2007.
Office Action for U.S. Appl. No. 10/892,982 mailed Apr. 8, 2008.
Office Action for U.S. Appl. No. 10/892,615 mailed Apr. 27, 2007.
Office Action for U.S. Appl. No. 10/892,615 mailed Dec. 12, 2007.
Office Action for U.S. Appl. No. 10/892,615 mailed Apr. 21, 2008.
Office Action for U.S. Appl. No. 11/057,988 mailed Aug. 18, 2008.

(56) References Cited

OTHER PUBLICATIONS

Office Action for U.S. Appl. No. 11/058,551 mailed Sep. 9, 2008.
(CISCO) A Report From Ironport Systems, "Data Loss Prevention Best Practices—Managing Sensitive Data in the Enterprise", 2007, 21 pages.
Office Action for U.S. Appl. No. 10/892,982 mailed Oct. 27, 2008.
Office Action for U.S. Appl. No. 10/892,615 mailed Dec. 5, 2008.
Office Action for U.S. Appl. No. 11/057,988 mailed Feb. 28, 2009.
Notice of Allowance for U.S. Appl. No. 10/431,145 mailed Jun. 5, 2009.
Office Action for U.S. Appl. No. 10/607,718 mailed May 1, 2009.
Office Action for U.S. Appl. No. 10/892,982 mailed Feb. 12, 2009.
Office Action for U.S. Appl. No. 10/892,982 mailed Jul. 20, 2009.
Office Action for U.S. Appl. No. 10/892,615 mailed May 12, 2009.
Office Action for U.S. Appl. No. 11/057,988 mailed Jul. 10, 2009.
Office Action for U.S. Appl. No. 11/058,551 mailed Mar. 20, 2009.
Office Action for U.S. Appl. No. 11/058,551 mailed Sep. 11, 2009.

* cited by examiner

SECURE AND SCALABLE DETECTION OF PRESELECTED DATA EMBEDDED IN ELECTRONICALLY TRANSMITTED MESSAGES

FIELD OF THE INVENTION

The present invention relates to the field of electronic message communications; more particularly, the present invention relates to detecting preselected (e.g., proprietary) data in messages being transmitted over a network.

BACKGROUND OF THE INVENTION

Many organizations store large amounts of security-sensitive information in relational databases. This type of data is usually subjected to very thorough security measures including physical security, access control, perimeter security restrictions, and—in some cases—encryption. Since access to database data is essential to the job function of many employees in the enterprise, there are many possible points of escape of this information.

Relational Database Systems

Relational database systems are useful for a huge range of applications. Relational structures hold data in a fashion that presents naturally intuitive ways to query the data, and has the added advantage of hiding the details of the underlying disk storage system from the user. The typical applications for database systems involve the storage and retrieval of a large number of smaller pieces of data that can be naturally formatted into a table structure. Relational databases have high utility because the types of queries that most people care about can be optimized using the well-known index structures outlined below.

The queries requested of relational database systems use a naturally intuitive predicate logic called Structured Query Language (SQL) that allows the user to succinctly request the tabular data that she/he may be looking for. Database tables almost always come equipped with an index that makes queries based on SQL more efficient. These indices are stored in memory using a data structure called a B-tree. The salient characteristics of B-trees most relevant to the current discussion are as follows:

B-trees are an abstract data structure based on the binary tree;
B-trees must contain some copies of the data that they index; and
B-trees are most efficient using the query examples outlined below.

Here are a number of query examples:
Exact match queries of the form A=v, where:
A refers to the column or "attribute" of a given database table
v refers to a specific attribute value
e.g., SELECT * FROM CUSTOMERS WHERE Income=30,000
Range queries of the form v1<A<v2, where:
A refers to the column or "attribute" of a given database table
e.g., SELECT * FROM CUSTOMERS WHERE 30<Income<40
Prefix queries of the form A MATCHES s*, where:
"s" refers to a specific string value
"s*" is a regular expression
e.g., Last_Name MATCHES "Smith*"

There are a number of references to original works in the field of database systems. The first is the seminal work on relational databases by Codd, namely E. F. Codd., "A Relational Model of Data for Large Shared Data Banks", Communications of the ACM, 13(6): 377-387, 1970.

The second reference is one of the first published works on the "B-Tree" data structure that is the fundamental data structure that enables efficient queries of the type outlined above. See Rudolf Bayer and Edward M. McCreight, "Organization and Maintenance of Large Ordered Indices", Record of the 1970 ACM SIGFIDET Workshop on Data Description and Access, Nov. 15-16, 1970, Rice University, Houston, Tex., USA (Second Edition with an Appendix), pages 107-141, ACM, 1970.

Information Retrieval Systems

Information retrieval is a broad field that deals with the storage and retrieval of textual data found in documents. These systems are different from those of database systems chiefly in their focus on standard documents instead of tabular data. Early examples of this system were developed as part of the SMART system at Cornell. Today, the best-known information retrieval applications are web-based search engines like Google, Inktomi, and AltaVista. The typical way to use these systems is to find a reference to a document that is part of a larger set of digital documents. The user experience for these applications usually consists of a series of queries interleaved with browsing of the results. Results of the queries are presented in order of descending relevance, and the user is able to refine the queries after further browsing. As with relational databases, the huge popularity of these systems is due to the ability of the underlying indices to deliver quick responses to the types of queries that people find most useful.

Most of these systems are based on indices that are derived from so-called "concordances" that are built up from the collection of documents indexed. These concordances contain a data structure that lists, for each word, the location of each occurrence of that word in each of the documents. Such data structures allow quick lookups of all documents that contain a particular term. For user queries that ask for all documents that contain a collection of terms, the index is structured so that it represents a large number of vectors in Euclidean vector space of high dimension. The user's list of query terms is then also re-interpreted as a vector in this space. The query is run by finding which vectors in the document space are nearest to the query vector. This last approach has a variety of different optimizations applied to it for accuracy and speed, and is called the "cosine metric".

As mentioned above, the typical user interaction with these sorts of systems is an iterative cycle of querying, browsing, refining, and back to querying again. Query results are usually large numbers of documents that are ranked in order of relevance, and the false positive rate can be very high. Here are some classic examples of queries.

Boolean queries like:
a) all documents that contain the terms "database" and "indices"
b) all documents that contain "database" or "indices" but not "Sybase" Link-based queries like:
a) all documents that are linked to by documents that contain the term "dog"
b) the most "popular" (i.e. linked to) document that contains the word "dog"

One of the first significant implementation projects of information retrieval systems is the SMART system at Cornell. This system contains many of the essential components of information retrieval systems still in use today: C. Buckley, "Implementation of the SMART Information Retrieval System", Technical Report TR85-686, Cornell University, 1985

The WAIS project was an early application of the massively parallel super-computer produced by Thinking Machines Inc. This is one of the first fielded information retrieval systems made available over the Internet. This primary reference source for this work is by Brewster Kahle and Art Medlar: "An Information System for Corporate Users: Wide Area Information Servers." Technical Report TMC-199, Thinking Machines, Inc., April 1991, version 3.19.

Among the many contemporary commercial vendors of Internet search services is Google. Google's real breakthrough in search accuracy is its ability to harvest data from both the text of the documents that are indexed as well as the hyper-link structure. See Sergey Brin, Lawrence Page, "The Anatomy of a Large-Scale Hypertextual Web Search Engine;" 1998.

File Shingling Systems

The growth of the Internet and cheap means of copying and distributing digital documents spurred research interest in technologies that can help detect illegal or inappropriate copies of documents. The primary application for this work was to detect the violation of copyright law, and to detect plagiarism. There is also significant interest in this problem as it relates to spam-email (AKA unsolicited commercial email) detection and automatic elimination. The technical term applied to describe most of these techniques is "file shingling" in which adjacent sequences of document fragments are reduced to "shingles" by hash codes, and then stored in a lookup table in the same sequence as they are found in the document.

File shingling provides a very quick way to look for similarity between two documents. In order to provide protection to a specific document (e.g., a text file) the document is shingled by hashing the document sentence-by-sentence and storing these hashed sentences in a table for quick lookup. In order to test a new document to see if it contains fragments of copyrighted content, the same hash function is applied to each fragment of the test message to see if the fragments appear in a similar order as they do in the copyrighted content. The technique is quick because the time required to lookup an individual fragment can be very fast.

The typical user interaction with a file shingling system is passive instead of active. File shingling systems are usually set up to process documents automatically and deliver the query results to a user asynchronously. A typical file shingling application might be spam prevention where a set of messages is used to create an index of restricted content that an organization does not want delivered to its email systems. In this scenario, the "query" is just the automatic processing of email messages and appropriate automatic routing.

With respect to document equivalency queries, for each test document t, find all documents d in our collection of indexed documents that have the same contents as t. For the case of spam detection, the set d could be all of the known active spam messages, and the document t could be an incoming email message.

With respect to cut-and-paste detection queries, for each test document t, find all documents d in our collection of indexed documents in which some fragment of d occurs in t. For the case of plagiarism detection, the set d could be all of the previously submitted essays for a particular class, and the document t could be a new paper written by a student who is suspected of plagiarism.

The main published research projects in file shingling are called KOALA, COPS, and SCAM. They all use variants on the basic file shingling approach described above with variants that optimize performance and accuracy. For information on KOALA, see N. Heintze, "Scalable Document Fingerprinting", Proceedings of Second USENIX Workshop on Electronic Commerce, November 1996. For information on COPS, see S. Brin, J. Davis, and H. Garcia-Molina, "Copy Detection Mechanisms for Digital Documents", Proceedings of the ACM SIGMOD Annual Conference, May 1995. For information on SCAM, see N. Shivakumar and H. Garcia-Molina, "SCAM: A Copy Detection Mechanism for Digital Documents", Proceedings of 2nd International Conference in Theory and Practice of Digital Libraries (DL'95), June 1995, and also see (by N. Shivakumar and H. Garcia-Molina), "Building a Scalable and Accurate Copy Detection Mechanism", Proceedings of 1st ACM Conference on Digital Libraries (DL'96), March 1996.

Internet Content Filtering Systems

A variety of commercial applications, referred to as content filtering systems, implement protection measures. There are two major types of applications in this category: web site restriction/monitoring software, and email content control. In both cases, the main algorithm currently in use is pattern matching against a set of regular expressions for a set collection of text fragments that would indicate inappropriate behavior. An example might be to restrict all browsing at URLs that contain the text fragment "XXX". An example for the email content control category is stopping and blocking all email that contains the words "proprietary" and "confidential" but not the words "joke" or "kidding".

SUMMARY OF THE INVENTION

A method and apparatus for detecting preselected data embedded in electronically transmitted messages is described. In one embodiment, the method comprises monitoring messages electronically transmitted over a network for embedded preselected data and performing content searches on the messages to detect the presence of the embedded preselected data using an abstract data structure derived from the preselected data.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
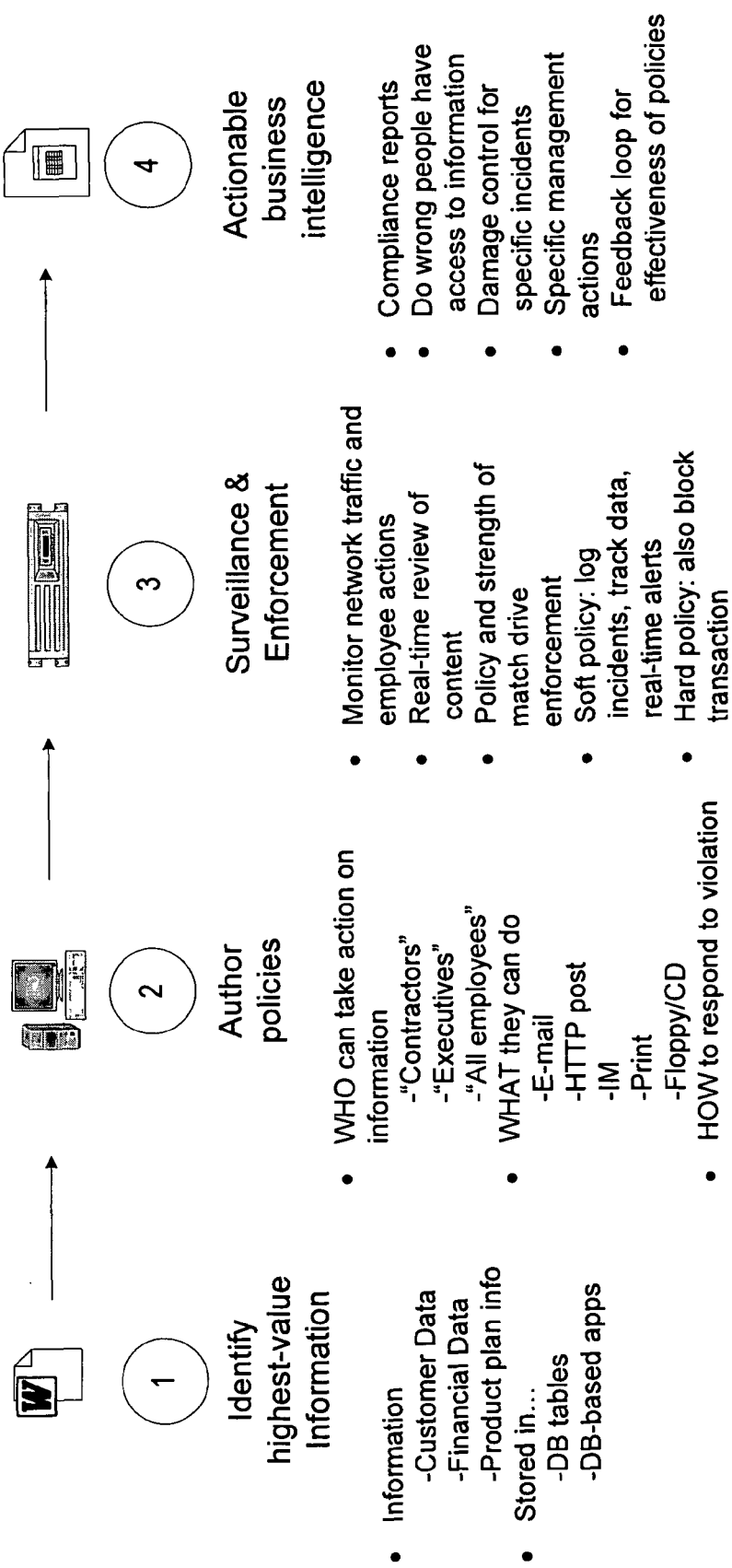
FIG. 1 illustrates one embodiment of a workflow.

A system and methodology is described herein to track and monitor the use of sensitive information as it travels across a network. In one embodiment, this monitoring is implemented by performing content searches on messages as they pass through various points on the network. In one embodiment, a content filter is placed at all possible points of exit of the network (e.g., network routers, firewalls, switches, HTTP proxies, email systems, printers, wireless access points, etc.)

and prevents the escape of, or in some cases logs, messages that contain restricted content (e.g., database information). The system described herein is able to detect this information in a secure and scalable fashion that is capable of handling large amounts of the database data. Database data may comprise any form of tabular-formatted data stored in a variety of systems including, but not limited to, relational databases, spreadsheets, flat files, etc.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices.

Components of an Exemplary Embodiment

In one embodiment, the system to perform the detection scheme described herein consists of two main components: a Policy Management System (PMS) and a Message Monitoring System (MMS). The PMS is responsible for accepting user input that determines information security policies for the use and transmission of data (e.g., database data) that's contained inside messages sent around the network. This data is, thus, preselected. The MMS is a network device that monitors messages sent over the network and is responsible for implementing the policy that the PMS has picked up from the user. In one embodiment, both of these systems are coupled to a computer network that communicates any of the standard protocols for the exchange of information.

In the normal course of operation in this embodiment, a user may decide to implement a given policy that restricts the use or transmission of database data by certain individuals and then manually enters this policy into the PMS using a graphical-user-interface and one or more user input devices (e.g., a mouse, a keyboard, etc.). The user interface receives the input and may be running on a computer system with the PMS or on a separate machine. An example policy might be to stop a given group of individuals in customer service from sending out customer information via email. In one embodiment, the policy includes the nature of protection desired (e.g., restrict only a subset of employees), the type of data that requires protection (e.g., database data), and the network location (e.g., database table name, IP address of server, server or file name) of the database data that requires protection. Again, all of this information may be specified using a standard graphical user interface that prompts the user to enter the specific information in the correct fields.

At regular intervals, which in one embodiment are adjustable by the user but defaulting to once per specified interval (e.g., day), the PMS queries the database and extracts copies of the database data that is to be protected and derives from that data an abstract data structure (hereafter called the "index") that is described in more detail below. These indices contain hash codes of fragments of the database that store the position of that fragment within the larger context of the database. These hashed data elements are simply the "cells" inside the database. The hash code is stored together with the row number, column number, and type of the column. These triplets of row number, column number and column types for the database cells are used to determine if a given message (e.g., email messages, web mail messages, etc.) might contain information that would violate the information security policy specified to the PMS as described above.

The PMS then sends this index, along with the particulars on the policy that is to be implemented, to the MMS so that it can begin to enforce that policy. The MMS receives the index from the PMS together with the details on the policy to be enforced. The MMS uses the index and the policy information to enforce the policy specified by the user. In one embodiment, the MMS uses this index by looking at each of the outgoing messages (e.g., email messages, web mail messages, etc.) and hashing each of the information fragments (e.g., cells in a database) and comparing the row numbers, column numbers, and types of the information fragments with the triplets in the hash table. Certain types of sequences of triplets found in the index that are derived from the outgoing message indicate that, with high probability, the outgoing message contains classified information. In one embodiment, the sequences of triplets that indicate that a message contains classified information are as follows: sequences derived from a message in which the derived triplets in the index that meet three criteria: 1) a plurality of those triplets have a common row number, 2) the members of that plurality each have a distinct column number, and 3) the members of that plurality contain type information that matched the type of information (e.g., numeric or string data) found in the outgoing message.

A summary of an exemplary workflow can be found in FIG. 1, where the highest-value information is identified, policies are authored, and surveillance and enforcement are performed, leading to actionable business intelligence.

Modes of Operation

Figure 2:
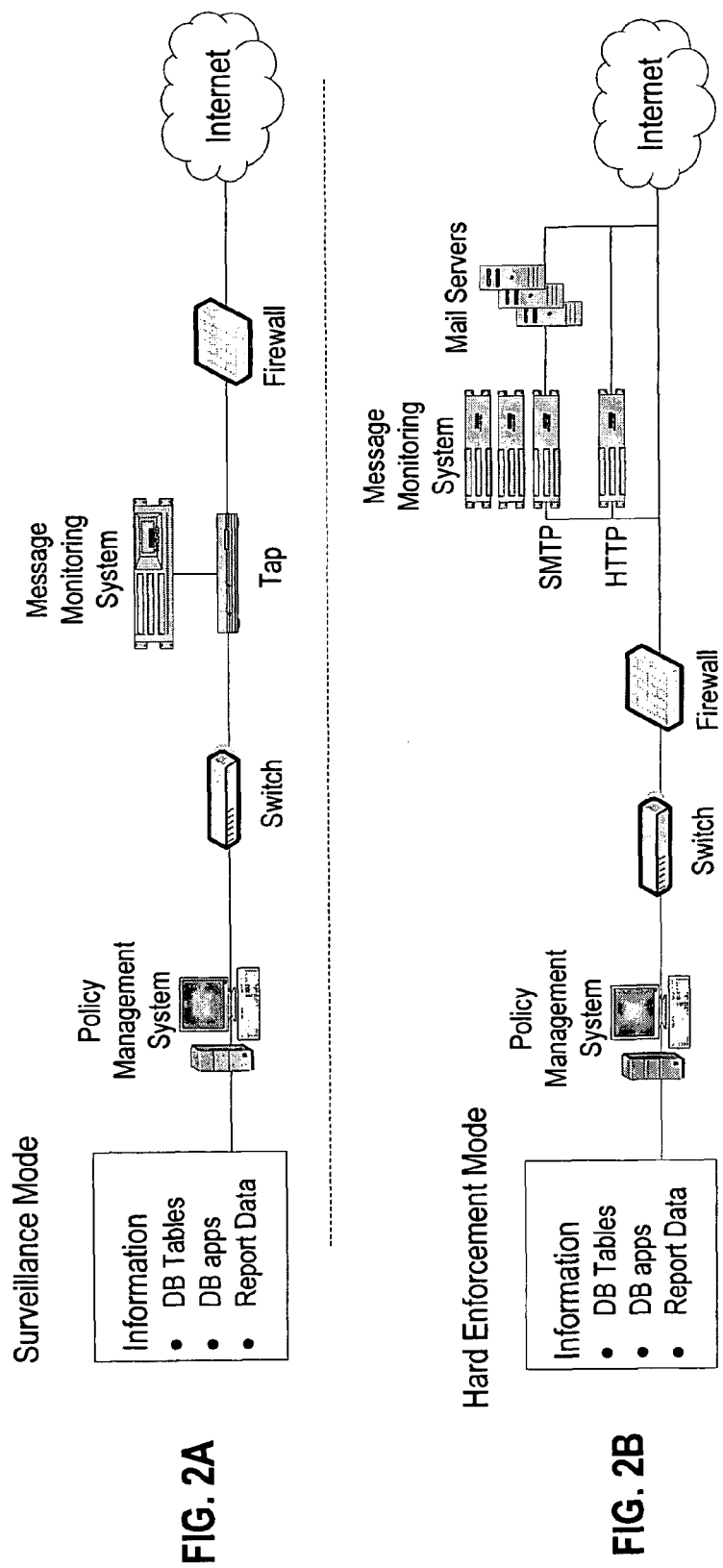
FIGS. 2A and 2B illustrate exemplary modes of operation.

In one embodiment, the Message Monitoring System can be configured in one of two ways: "surveillance mode", and "enforcement mode". FIG. 2 illustrates two network configurations. In surveillance mode, the MMS is placed somewhere on the network where it can watch traffic and report on violations of policy, but it is specifically not configured to block messages as they leave. This is shown in FIG. 2A where the PMS has access to information. The PMS is coupled to the Internet via a switch, a tap and a firewall. The MMS monitors the network messages using the tap. In "enforcement mode", the MMS is able to watch traffic and report on violations, but it can also intercept and re-route messages so that their ultimate destination is changed. This is shown in FIG. 2A where the PMS has access to information and is coupled to the Internet via a switch and a firewall. In this embodiment, the MMS monitors traffic using a series of servers and re-routes traffic to, for example, certain servers, if the MMS determines messages are likely to contain preselected information. The MMS may use different servers for each of the various layer protocols.

Message re-routing is not mandatory. Alternately, the MMS can be configured to just intercept and stop the outgoing message. An example policy in "enforcement mode" would be to route all messages that violate a policy to the manager of the person that violates the policy so that appropriate disciplinary action can take place.

In both modes of operation, it is possible to install multiple MMSs, each with its own copy of the indices required to detect content. This parallel processing configuration helps with problems of scale and with protecting multiple possible points of egress of information.

In both configurations, the MMS is actively parsing messages that are transported using various application layer protocols (e.g., SMTP, HTTP, FTP, AIM, ICQ, XML, etc.)

In one embodiment, the two subsystems (PMS and MMS) run on one Local Area Network (LAN). However, the PMS and MMS may be incorporated into the same physical or logical system. This consolidated configuration is more appropriate for reasons of control cost of goods required to produce the system.

In yet another alternative embodiment, the PMS and MMS may not necessarily reside on the same LAN. The PMS may reside on the same LAN as the database information, but the MMS may reside on a different LAN that is separated from the LAN on which PMS resides. In this configuration, the two distinct LANs may ultimately be coupled together via the Internet but separated by firewalls, routers, and/or other network devices. This is an advantageous configuration for the case where a company wants to restrict another company that needs their database data (such as a law firm or marketing agency) from violating the first company's database data policy.

Security Requirements for One or More System Embodiments

Since the embodiments of the detection system are used to enforce information security policies, the security properties of this system are paramount. In one embodiment, the chief objective of this system is to enforce security policies that are pertinent to database data. This implies that the system must be very secure in the manner in which it handles database data. If, in the process of protecting the database data, the system opens up new avenues to steal database data, then its ultimate purpose is defeated.

In one embodiment, the MMS is deployed in such a way as to monitor and/or block the largest number of messages flowing through the network. This means installing the MMS at various points in the network where traffic is concentrated (e.g., routers, mail systems, firewalls, etc.) This means that the MMS may be installed either behind or in front-of one of these points of concentration on the network. Such placement of the system affords it an exceptional view of message traffic and increases its utility for the organization using the system. Unfortunately, such placement also makes the MMS highly vulnerable to network-based attacks (commonly called "hacking") in which a third party uses unauthorized network access to violate the security perimeter surrounding the network to steal the data contained inside the network.

The PMS's security concerns are also high in that its software directly queries the information sources in order to build the index that the MMS utilizes.

This is one of the chief security concerns for this application, namely: its placement in the network that makes it most useful also makes it most exposed to attack. These attacks can come from inside the Local Area Network (LAN) or from outside the LAN via the WAN and/or Internet link that the organization maintains. The specific security concern here is that the MMS may contain valuable database data from the relational database that it is trying to protect. The concern is that hackers may try to steal the data from the MMS instead of trying to steal it from the more-thoroughly guarded computer on which the relational database actually runs.

A second and related security concern for the application arises in the case when the MMS is deployed at a different LAN from that in which the PMS is deployed. As mentioned above, this may be an important configuration to help implement security policy across two organizations that share database data. Here again, the information stored in the MMS is subjected to information security threats.

Various embodiments treat these security threats directly. One aspect of novelty of these embodiments described herein is that the PMS/MMS pair that exchanges indices that contain no copies of the data that it is seeking to protect. As covered above, the PMS sends abstract data structures derived from the database data to the MMS so that it can enforce policy. One possible, but naïve, approach to achieve this protection is to simply copy the database into the MMS, or (equivalently from a security perspective) allow the MMS to directly query the database in order to check that the content is consistent with policy. The problem with this approach is that it introduces significant security vulnerabilities where there were none before. In this naive approach, the cure is worse than the disease.

In one embodiment, the PMS creates an index from the database that contains no copies of the database data. In the process described below, the data stored in the indices only retains the relative placement of the elements in the database in relation to other elements. Other embodiments of this same solution utilize indices that contain fragments of the intellectual property that is under protection, thus reducing the value of the solution by exposing that information to security threats. In one embodiment, the techniques described herein specifically avoid storing any representation of the data itself so that, in the case of a hacker breaking into the host that runs the MMS; the data that is exposed to theft is inconsequential.

An alternate embodiment to that described by the process given below could be done to enhance performance. In this alternate embodiment, copies of only a small amount of frequently used strings and numbers from the database that represent a large proportion of the data in the system is still stored directly in the index along with the rest of the information on relative placement of data in the database table(s). This is done by storing copies of these common strings themselves, instead of hash codes. In this alternate approach, the system stores (for these common terms) the row numbers, column numbers, and type of the database data, but now instead of storing a hash code it stores the string itself. For the rest of the cells of the database that are not quite so common, only the row numbers, column numbers, and type of the database data are stored while specifically not storing copies of these strings. This optimization uses the fact that the statistical distribution of string and numeric data in databases is often skewed so that the most common terms account for a very large percentage of the overall volume of data stored. Storing these common terms in a separate index helps index query efficiency since the small number of common terms accounts for a large proportion of the queries, and these queries can be run using standard quick techniques from the literature (e.g., hash table lookups, bitmaps, etc.). The reason that this is not a security vulnerability is that this small number of terms that account for a disproportionate share of volume of database data are the least valuable pieces of data. The terms "John" and "Smith" are very common inside databases that contain names, but the theft of these terms is relatively worthless. In this embodiment, the system is still carefully avoiding storing and copies of data of less-common terms of higher value (e.g., credit card numbers, SSN, uncommon names, etc.). In this embodiment, as in the previously abovementioned embodiment, the system avoids storing any copies of sensitive information by storing only hash codes and triplets of information related to the placement of cells in the database.

An Exemplary Algorithm

In one embodiment, the process of information detection includes two major operations, or phases: indexing, and searching. In the indexing phase, the system builds indices from the database tables. One of the important innovations is contained in the indexing phase of this operation, namely that no fragments of text from the database are actually stored in the index. In one embodiment, the index contains the row number, and column number, and type of the tokens, but there is no record of any sort (even in encrypted or hashed form) of the database data itself. This is a non-standard indexing scheme in that it specifically contains no records of the database data itself, but rather only contains information about the relative placement of data records in the context of the larger whole.

Note that token typically means one word, but can mean clusters of words such as, for example, words enclosed in quotation marks. The word "this" may be a token in that it's a possible value found in a database cell. The word "this token" may be also a standalone token since the string (together with the space character) is a single string that could be stored in a database cell.

In the "searching" phase of the process, another key innovation is found. The system uses "accumulators" to produce matches in which some subset of the tokens on a given line of a message can trigger a match against the database. These accumulators are lists of candidate hits against the database in which each set contains candidate matches of content from the database that all appear to be from the same row in the database. This innovation addresses the issues raised above concerning the disadvantages of applying standard connectives from predicate logic.

More specifically, for indexing, in one embodiment, the process performs the following operations:

1) For each cell in the table: Store row #, column #, and data type indicator (e.g., data types like "string", "integer", and "floating point number", etc.) in a hash table. The hash table is an array of lists, where the lists are tuples <r, c, t> where "r" is row # "c" is column #, and "t" is type. These lists may be considered to be collision lists.

2) Sort the collision lists in lexicographic order (e.g., by r, then by c, then t).

Figure 3:
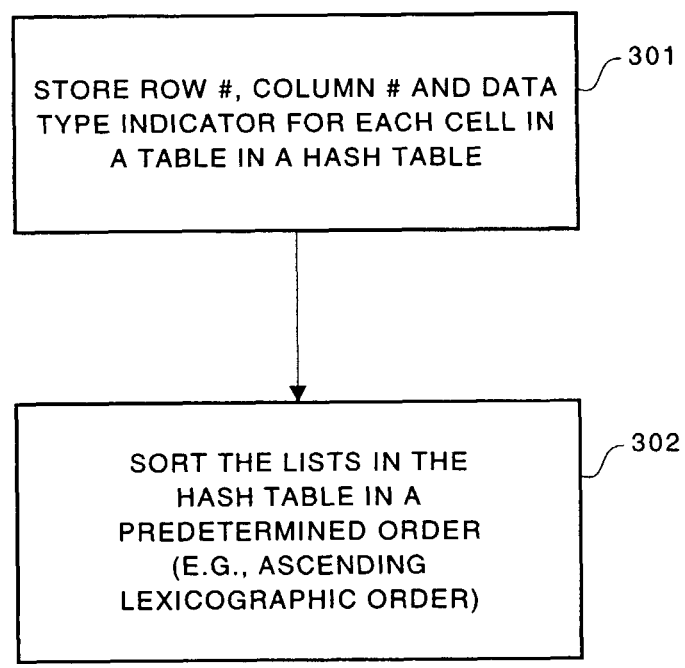
FIG. 3 is a flow diagram of one embodiment of a process for indexing database data.

The indexing process is depicted in FIG. 3. The process is performed by processing logic that may comprise hardware (circuitry, dedicated logic, etc.), software (such as is run on a general purpose computer system or a dedicated machine), or a combination of both. Referring to FIG. 3, processing logic stores a row number, a column number, and a data type indicator for each cell in a table in a hash table (processing block 301). Then processing logic sorts the lists in the hash table in a predetermined order (processing block 302).

With respect to searching, the following operations are performed:

(1) Parse an incoming message looking for column-formatted data. In one embodiment, lexical analysis may be used to look for runs of <cr> or <cr><lf> separated lines that contain a set of tokens in which the number of tokens found in adjacent lines is identical in number and in type. The type of each token is stored, along with total number of tokens.

(2) For each line that resembles column-formatted data:

(a) For each token k in the line, look up the collision list at H(k). For each element of the collision list at H(k) that has the same type as that of k add these elements to a list called L;

(b) Regroup L into a set of accumulators: {A1, A2, A3, . . . . An} where $A_i$ is a list of all the elements in L that correspond to a unique row number;

(c) Sort L (the list of accumulators) by length of each $A_i$ and check for unique occurrences of columns; and (d) Report lines of text with $A_i$ that are "large" and have unique column numbers. In one embodiment, "large" means an adjustable parameter that corresponds to the sensitivity of database data detection. A typical application may have this parameter default to size "3" or larger. In such a case, the configuration reports rows that, with high probability, contain 3 or more columns of database data that can be found all on the same row.

Figure 4A:
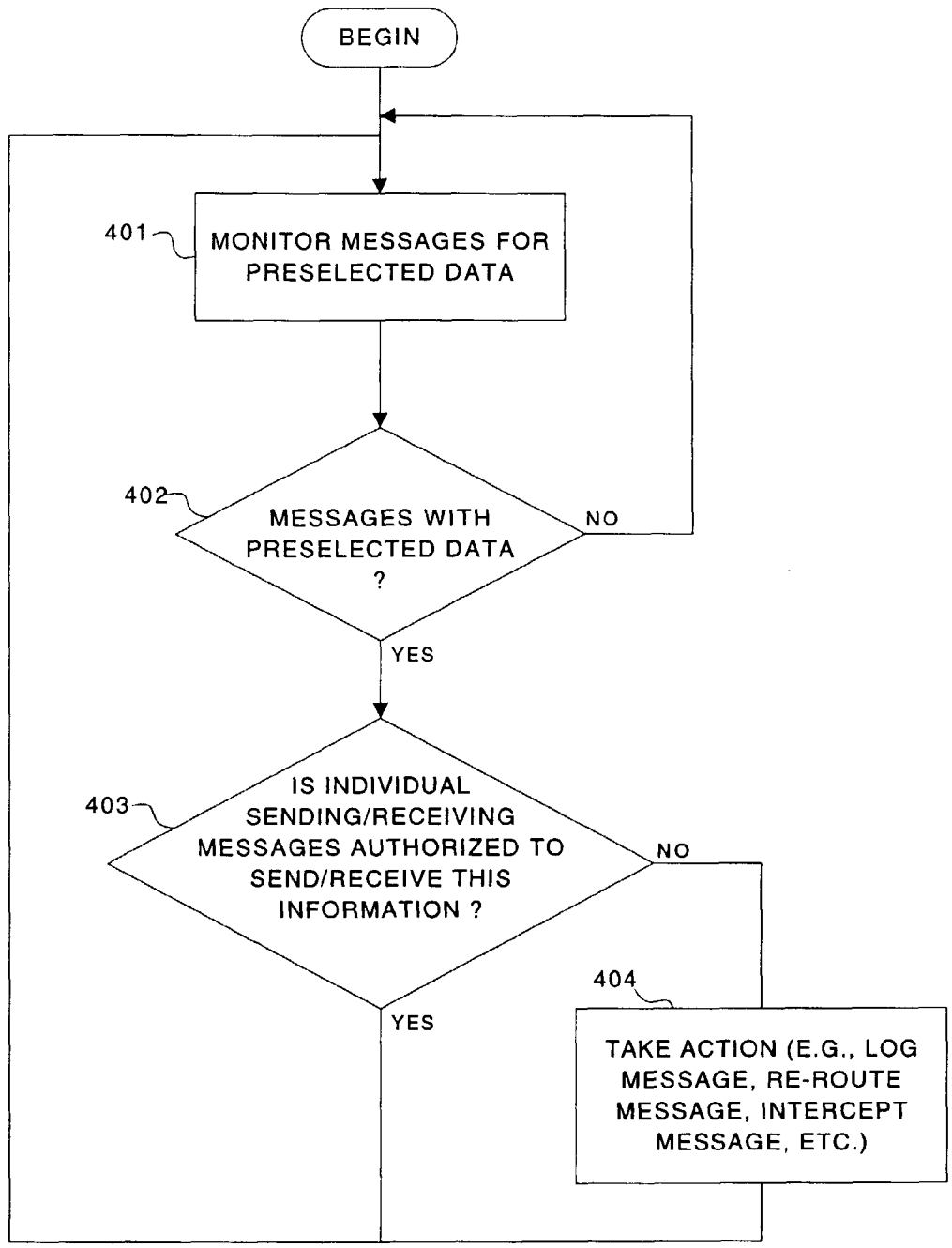
FIGS. 4A and 4B are flow diagrams of one embodiment of a process for searching text in messages for preselected data.
Figure 4B:
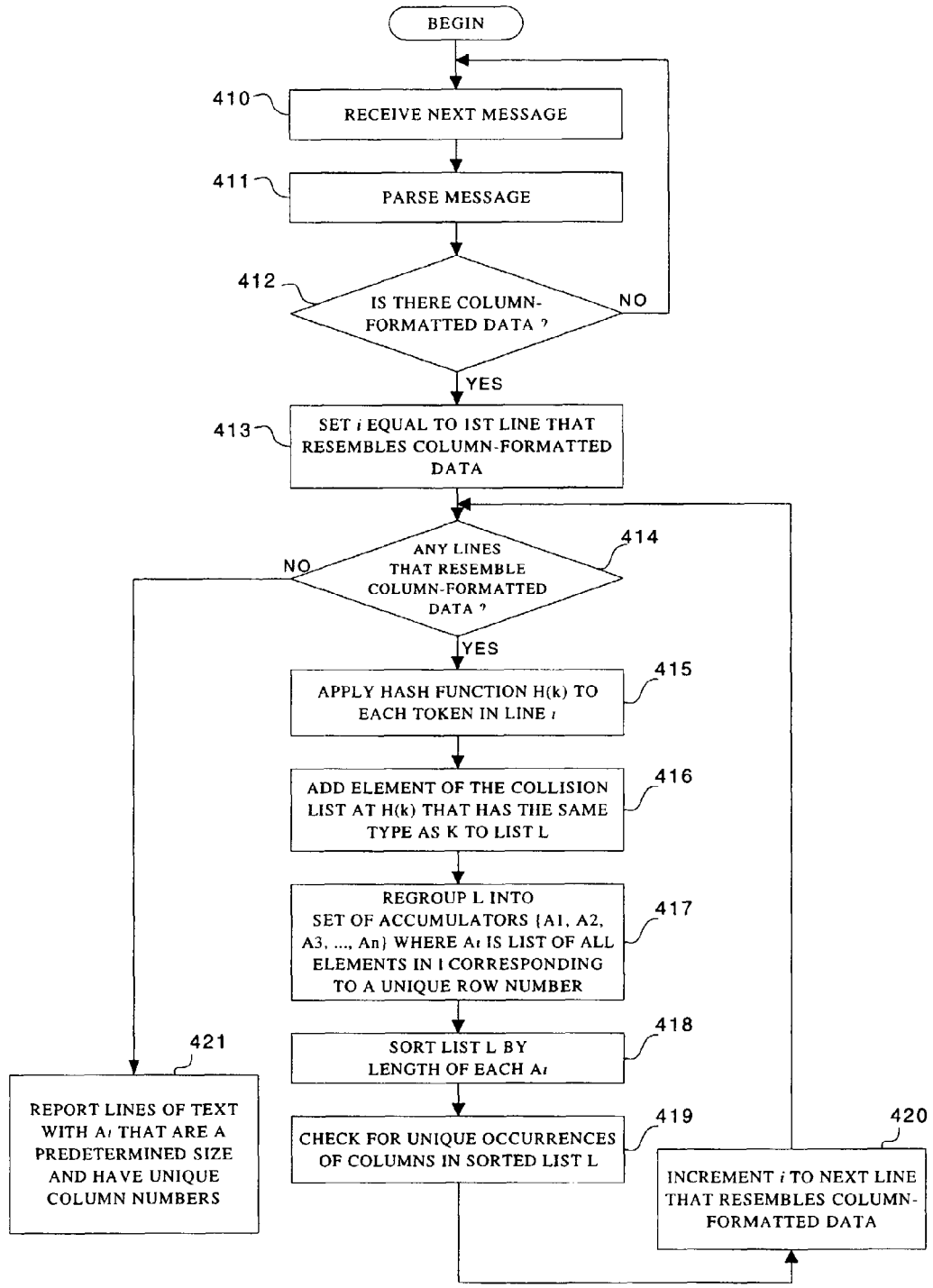

FIGS. 4A and 4B are flow diagrams of one embodiment of the process of searching. The processes are performed by processing logic that may comprise hardware (circuitry, dedicated logic, etc.), software (such as is run on a general purpose computer system or a dedicated machine), or a combination of both. Referring to FIG. 4A, processing logic monitors messages for preselected data (processing block 401). Next, processing logic determines whether a message has preselected data (processing block 402). If not, processing transitions to processing block 401. If so, processing logic determines if the individual sending/receiving message is authorized to send/receive the information in the message (processing block 403). If so, the process ends and processing transitions to processing block 401. If not, processing logic takes one or more actions (processing block 404) and processing transitions to processing block 401.

Referring to FIG. 4B, processing logic receives the next message (processing block 410) and parses the next message (processing block 411). Thereafter, processing logic test whether there is column-formatted data in the message (processing block 412). If not, processing transitions to processing block 410. If so, then processing transitions to processing block 413 where processing logic sets i equal to the first line that resembles column-formatted data.

Afterwards, processing logic tests whether there are any lines of column-formatted data in the message (processing block 414). If no, processing logic reports lines of text with the Ai that are a predetermined size and with unique column number (processing block 421). If so, processing transitions to processing block 415 where processing logic applies a hash function H(k) to each token in line i. Then processing block adds the element of the collision list at H(k) to list L that has the same type as k (processing block 416) and regroups into a set of accumulators (processing block 417). Next, processing logic sorts that list L by the length of each Ai (processing block 418) and checks for unique occurrences of columns in sorted list L (processing block 419). Then processing logic increments i to the next line that resembles column-formatted data (processing block 420) and the process transitions to processing block 414.

An Exemplary Application

In the normal course of operation in one embodiment, it is assumed that the PMS is positioned on a corporate network so that secure communications can occur with an organization's database (in which the records reside that require protection.) In the normal course of operations, it is also additionally assumed that the MMS is positioned so that it can monitor and/or intercept all outbound email communications of the organization.

In this example, assume that the organization seeks protection on a database table called "CustomerRecords" that contains four columns: 1) first name, 2) last name, 3) credit card number, and 4) account balance. Employees of this organization would use the user interface application served by the PMS to specify that the CustomerRecords table required protection against theft via email. The PMS would then build an index of the records in the CustomerRecords table that consists of a hash table derived from the string values of the cells in the database. That is, the values in the cells are used to look values up in the hash table. The hash table itself contains records of the respective row number, column number, and data type of the cell itself. In the (frequent) cases of collisions in the hash table, a "collision list" holds multiple such records of row#, col #, and type. Once all cells in the database table are hashed into such a structure, the index is created and ready to be transmitted to the MMS. Note that the index contains no records of the database data itself. This is a key security constraint satisfied by this system.

After the MMS receives the index, it parses the message and re-creates the hash table in memory in the same fashion as it was created in the PMS.

As the MMS picks up outbound email messages and parses them, it uses this index in the manner described below to detect if any of these emails contain data from the database. This is done by parsing each individual line of text from the email messages. This may involve decoding the surrounding file types and converting everything into raw text (e.g., stripping all formatting information from a MicroSoft Word file and leaving only the text itself.) This series of lines of text is then parsed into individual words by looking for separation marks like the "space" character, or other forms of punctuation. These words are text tokens. For each line of text tokens, this system then consults the index by applying the hash function to each token. The result of this operation is a hash table collision list for each token on the line. As described above, each collision list is itself a set of data elements that store possible row number, column number, and type triplets. If the union of all triplets from all collision lists is taken, and if a set of triplets is found with all with the same row number, but with distinct column numbers, then with high probability this line of text from the email message contains a record from the database.

Comparison with the Prior Art

Database query mechanisms are significantly different from the teachings described herein. One difference is that B-trees actually contain fragments of the database tables that they index. In the approach described above, there are no copies of the database data stored inside the index. The reason that this is important is that—as mentioned above—the MMS has to have a copy of the index in order to protect the data from escape; however the MMS is also best deployed in a position in the network where it may be exposed to significant threats. Keeping the index that the MMS uses free of any components of the database data is a key requirement.

Another difference between standard database query mechanisms and the invention outlined here has to do with the types of queries that are required. The standard set of queries used in relational databases is based on predicate logic using connectives like AND and OR. This basic system does not work well for detection of database data that is typically cut-and-paste into email and webmail messages. Database data that is cut-and-past into email messages is typically from reports and will often contain data in each line that is extraneous and not found inside the database table. An example could be an email message that contains, for example, account information for a bunch of customers. Such a message will contain plenty of records from the core database that requires protection, e.g., first name, last name, social-security number, etc., but could also contain information not in the core database tables. A typical example is information that is "joined" from other databases. Another example is simple line formatting tokens that separate fields of database data. Because of the possibility of this extra data that's typically found on each of these lines, the standard predicate logic connectives like AND and OR applied to each token on the line of an outgoing message produce either too many hits (as is the case with OR) or zero hits (as is the case with AND). In the description herein, the system is able to detect the presence of n or more tokens that are all from the same row of a database table, even in the case where n is much smaller than the total number of tokens in the line. This is another significant difference between the present invention and the prior art mentioned above for database and document query mechanisms.

There are several major differences between the techniques described above and information retrieval technologies. Firstly, the indices for these systems contain (inside the concordances) the same terms that are stored in the database that is to be protected. Here again, since the system deploys this index into a location on the network that is potentially under hacker threat; this is a definite disadvantage. Secondly, these query systems run Boolean queries using the forms of predicate logic like AND and OR. As mentioned above, this approach is at a distinct disadvantage for detecting database records that have been possibly "joined" with extraneous data from other tables.

The technique of file shingling is similar to, but substantially different from the technique described herein. In file shingling, the subject of interest is text data (prose, software, outlines, etc.). In the techniques described here, the focus is on protecting database data. One difference is that database data from a given database table may appear with the row order or column order permuted arbitrarily in the test message. These permutations are the simple result of the query mechanisms typically applied to extract database data. A database query could result in a block of database data that comes in arbitrary column order, and arbitrary row order. For this reason, the basic technique of file shingling will not work if applied to database data. File shingling assumes that the same linear sequence is followed between the protected document and the test document.

There are many important differences between internet content filtering systems and the teachings described herein. As mentioned above, Internet content filtering systems are based on keyword searches. The novel techniques described above build an abstract data structure from the database data that it seeks to protect. This abstract data structure does not contain fragments of the text it is trying to protect. A keyword filtering system must contain some representation of the text that it is searching for in order to run its queries. The second major difference is that these Internet content filtering systems are not intended to protect database data. Using regular expression matching to detect violations of an organizations privacy policy on database data will also lead to a very inaccurate method of detection. These systems are primarily applied to stop employee abuse of the Internet as it relates to pornographic or abusive content and language. Such systems, if applied to the protection of database data, would use regular expressions to match database records. This would also result in transferring fragments of the database data to the computer on the network where security risks are maximized.

An Exemplary Computer System

Figure 5:
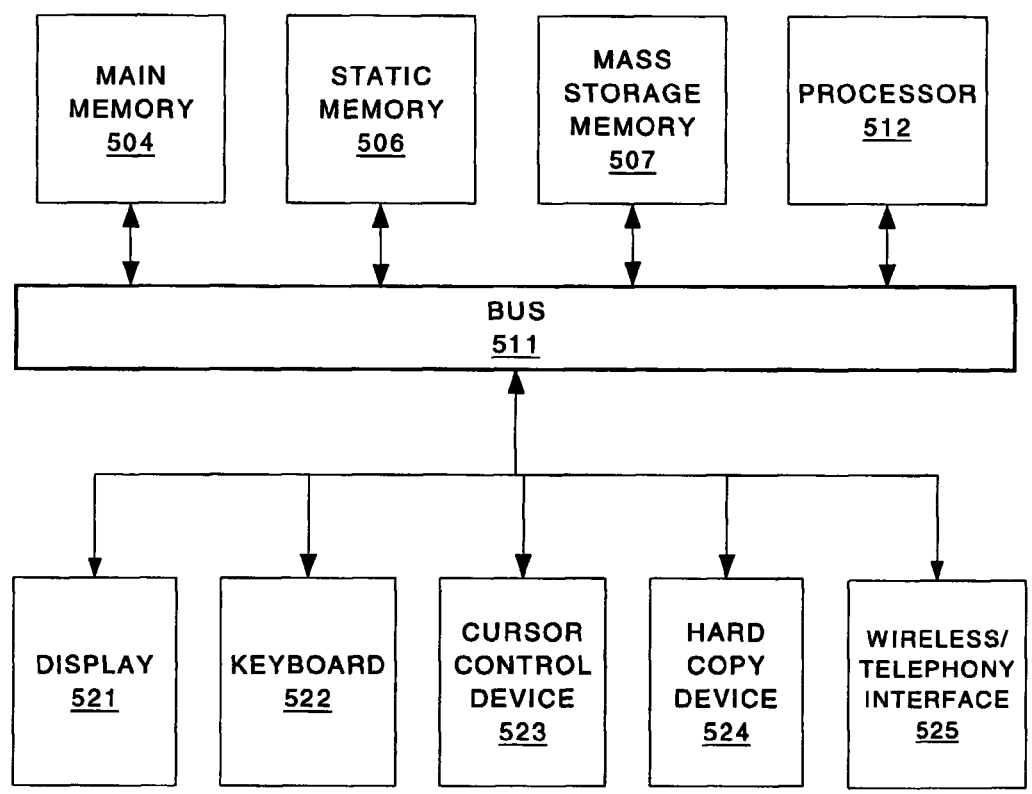
FIG. 5 is a block diagram of an exemplary computer system that may perform one or more of the operations described herein.

FIG. 5 is a block diagram of an exemplary computer system that may perform one or more of the operations described herein. Referring to FIG. 5, computer system 500 may comprise an exemplary client 550 or server 500 computer system. Computer system 500 comprises a communication mechanism or bus 511 for communicating information, and a processor 512 coupled with bus 511 for processing information. Processor 512 includes a microprocessor, but is not limited to a microprocessor, such as, for example, Pentium™, PowerPC™, Alpha™, etc.

System 500 further comprises a random access memory (RAM), or other dynamic storage device 504 (referred to as main memory) coupled to bus 511 for storing information and instructions to be executed by processor 512. Main memory 504 also may be used for storing temporary variables or other intermediate information during execution of instructions by processor 512.

Computer system 500 also comprises a read only memory (ROM) and/or other static storage device 506 coupled to bus 511 for storing static information and instructions for processor 512, and a data storage device 507, such as a magnetic disk or optical disk and its corresponding disk drive. Data storage device 507 is coupled to bus 511 for storing information and instructions.

Computer system 500 may further be coupled to a display device 521, such as a cathode ray tube (CRT) or liquid crystal display (LCD), coupled to bus 511 for displaying information to a computer user. An alphanumeric input device 522, including alphanumeric and other keys, may also be coupled to bus 511 for communicating information and command selections to processor 512. An additional user input device is cursor control 523, such as a mouse, trackball, trackpad, stylus, or cursor direction keys, coupled to bus 511 for communicating direction information and command selections to processor 512, and for controlling cursor movement on display 521.

Another device that may be coupled to bus 511 is hard copy device 524, which may be used for printing instructions, data, or other information on a medium such as paper, film, or similar types of media. Furthermore, a sound recording and playback device, such as a speaker and/or microphone may optionally be coupled to bus 511 for audio interfacing with computer system 500. Another device that may be coupled to bus 511 is a wired/wireless communication capability 525 to communication to a phone or handheld palm device.

Note that any or all of the components of system 500 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method comprising:
   identifying, by a message monitoring system (MMS), an abstract data structure derived from preselected data to be protected from traveling across a network, the abstract data structure not revealing data elements of the preselected data to be protected;
   performing, by the MMS, content searches on a plurality of messages electronically transmitted to reach a respective destination over the network, the content searches to be performed to determine whether one or more of the plurality of searched messages contain at least a portion of the preselected data to be protected using the abstract data structure that does not reveal the data elements of the preselected data; and
   causing a searched message of the plurality of searched messages to be prevented from reaching the respective destination in response to a determination that the searched message contains at least a portion of the preselected data to be protected.

2. The method defined in claim 1 wherein the preselected data comprises database data.

3. The method defined in claim 1 wherein the abstract data structure comprises an index.

4. The method defined in claim 3 wherein the index does not include a copy of the preselected data.

5. The method defined in claim 3 wherein the index comprises a relative placement of elements in a database in relation to other elements in the database.

6. The method defined in claim 3 wherein the index comprises a hash table derived from string values of the cells of database data.

7. The method defined in claim 3 wherein the index comprises a row number, column number and type of column associated with a fragment within the database.

8. The method defined in claim 1 further comprising:
creating, by a policy management system (PMS), the abstract data structure based on the preselected data extracted from the database.

9. The method defined in claim 8 wherein creating the abstract data structure based on the preselected data extracted from a database comprises:
querying a database; and
extracting at least one copy of the preselected data from the database.

10. The method defined in claim 8 wherein creating the abstract data structure comprises:
storing a row number, column number, and data type indicator for each cell in a database table into a hash table; and
sorting the hash table based on a predefined order into a collision list.

11. The method defined in claim 10 wherein the order comprises ascending lexicographic order.

12. The method defined in claim 1 wherein performing content searches on the plurality of messages electronically transmitted to reach a respective destination over the network using the abstract data structure that does not reveal the data elements comprises:
parsing individual lines of text in one message of the plurality of messages to parse the one message into individual words;
applying a hash function to each of the individual words in an individual line of text to generate individual hash table collision lists for each of the individual words on each of the individual lines of text; and
identifying data sets within the individual hash table collision lists with common row numbers and distinct column numbers as preselected data.

13. The method defined in claim 1 wherein the preselected data comprises proprietary information selected based on a policy.

14. The method defined in claim 13 further comprising accepting user input specifying the policy.

15. The method defined in claim 14 wherein accepting user input specifying the policy comprises receiving information on a graphical user interface.

16. The method defined in claim 13 wherein the policy includes a specification of the data and a network location of the data.

17. The method defined in claim 16 wherein the specification of the data comprises a table name.

18. The method defined in claim 16 wherein the specification of the data comprises a database identifier.

19. The method defined in claim 16 wherein the network location comprises an IP address of a server.

20. The method defined in claim 19 wherein the network location comprises a server identifier.

21. The method defined in claim 1 wherein monitoring messages occurs at a plurality of exit points of the network.

22. The method defined in claim 1 further comprising:
periodically querying a database by a policy management system (PMS);
extracting copies of database data that is to be protected; and
deriving the abstract data structure based on extracted data and its location in the database.

23. The method defined in claim 1 further comprising receiving the abstract data structure by the message monitoring system.

24. The method defined in claim 1 further comprising:
preventing escape of messages containing preselected database content.

25. The method defined in claim 1 further comprising:
logging messages that contain database content.

26. The method defined in claim 1 further comprising:
reporting violations of the policy.

27. The method defined in claim 1 further comprising:
intercepting one or more messages; and
re-routing the one or more messages to a new destination.

28. A preselected data protection system comprising:
a policy management computer system to set a policy identifying preselected data to be protected from traveling across a network and to derive an abstract data structure from the preselected data to be protected, the abstract data structure not revealing data elements of the preselected data to be protected; and
a message monitoring computer system to implement the policy by
performing content searches on a plurality of messages electronically transmitted to reach a respective destination over the network, the content searches to be performed to determine whether one or more of the plurality of searched messages contain at least a portion of the preselected data to be protected using the abstract data structure that does not reveal the data elements of the preselected data; and
preventing a searched message of the plurality of searched messages from reaching the respective destination in response to a determination that the searched message contains at least a portion of the preselected data to be protected.

29. The system defined in claim 28 wherein the policy includes a specification of the data and a network location of the data.

30. The system defined in claim 29 wherein the specification of the data comprises a table name.

31. The system defined in claim 29 wherein the specification of the data comprises a database identifier.

32. The system defined in claim 29 wherein the network location comprises an IP address of a server.

33. The system defined in claim 32 wherein the network location comprises a server identifier.

34. The system defined in claim 32 wherein the network location comprises a file name of columnar-formatted data.

35. The system defined in claim 28 wherein the policy management system and the message monitoring system are incorporated into the same physical system.

36. The system defined in claim 28 wherein the policy management system and the message monitoring system are incorporated into the same logical system.

37. The system defined in claim 28 wherein the policy management system and the message monitoring system do not reside on the same local area network (LAN).

38. The system defined in claim 28 wherein the policy management system and the message monitoring system reside on two distinct local area networks (LANs coupled together via the Internet.

39. A non-transitory computer-readable storage medium that provides instructions, which when executed on a processor causes the processor to perform a method comprising:
identifying an abstract data structure derived from preselected data to be protected from traveling across a network, the abstract data structure not revealing data elements of the preselected data to be protected;
performing content searches on a plurality of messages electronically transmitted to reach a respective destination over the network, the content searches to be performed to determine whether one or more of the plurality of searched messages contain at least a portion of the preselected data to be protected using the abstract data structure that does not reveal the data elements of the preselected data; and causing a searched message of the plurality of searched messages to be prevented from reaching the respective destination in response to a determination that the searched message contains at least a portion of the preselected data to be protected.

* * * * *